3,069,011
ARRANGEMENT FOR THE SORTING OF MAIL-ITEMS ACCORDING TO SIZE
Fritz Buchwald and Horst Fliegner, Berlin-Lankwitz, Werner Kastenbein, Berlin-Neukolln, and Willy Sindzinski, Berlin, Germany, assignors to International Standard Electric Corporation, New York, N.Y., a corporation of Delaware
Filed Nov. 23, 1959, Ser. No. 854,801
7 Claims. (Cl. 209—90)

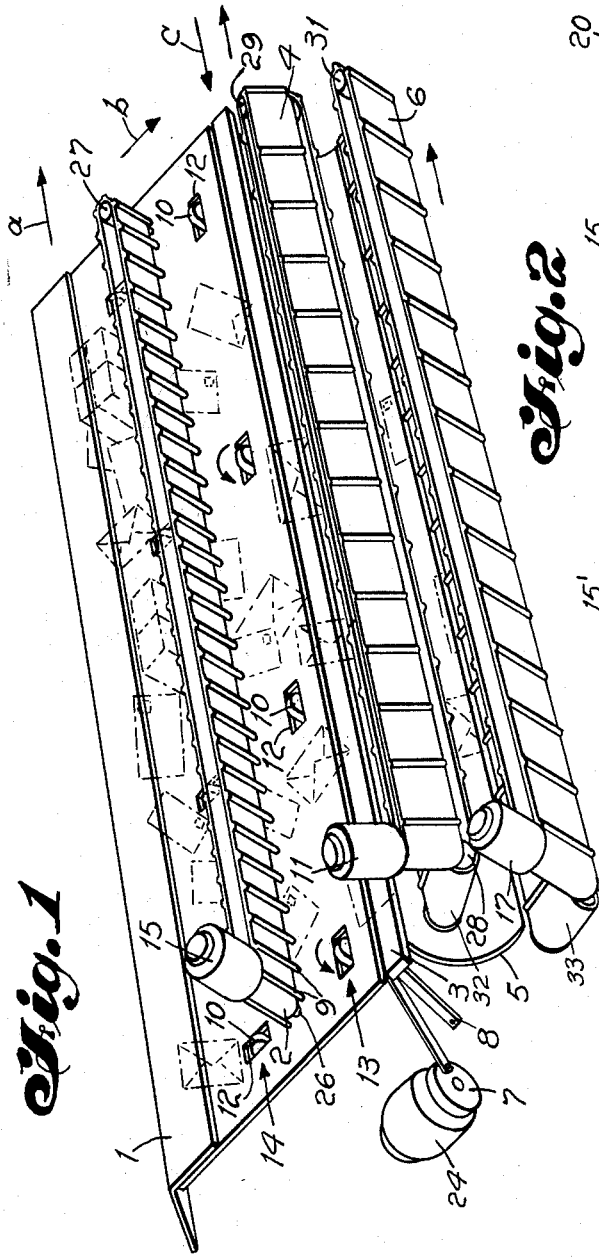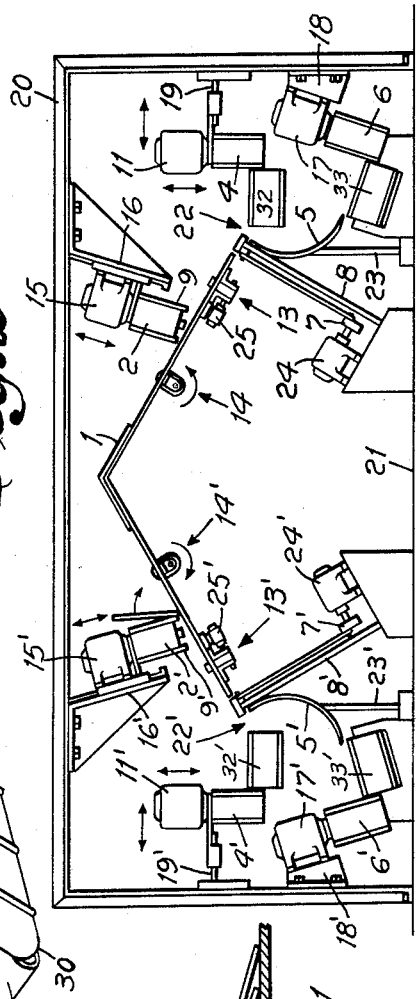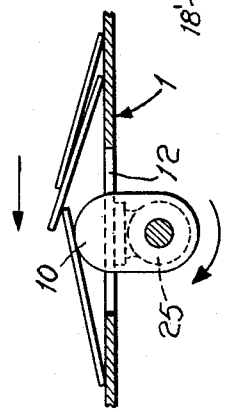
INVENTORS.
FRITZ BUCHWALD
HORST FLIEGNER
WERNER KASTENBEIN
BY WILLY SINDZINSKI
Joseph M Weigman
ATTORNEY United States Patent Office 3,069,011
Patented Dec. 18, 1962

The invention relates to an arrangement for sorting and culling letters (mail-items), according to size. This arrangement employs a track over which the unculled mail-items are led past directing devices as they arrive. By these directing devices the mail-items, according to size, are led into secondary tracks which are branched off the main track. The directing devices, are arranged on one hand at the side of the track boundaries and, on the other hand, in the bottom thereof. The goods to be sorted are first of all culled in accordance with the thickness of the individual items to be conveyed, and are thereafter branched off in accordance with the remaining sizes. In most cases the track is sloped, or is inclined, so that the mail-items to be culled are fed to the directing devices arranged on the lower edge, by way of their force of gravity.

In this arrangement the sorting or culling is performed according to size, that is, according to the length, width, and thickness of the goods to be conveyed, by way of gaps or spaces provided in the bottom, in such a way that the smaller items to be conveyed fall into the slots and the larger ones slide thereover. In this connection it may easily happen that when smaller and larger items overlap each other on the conveying path, the larger items carry the smaller ones over the slots, so that the culling is not performed properly. The present invention avoids this disadvantage. This is accomplished in that the directing device, which is provided in the bottom, is constituted by a gap (or space) extending over the entire width of a table adapted to receive the goods. On the one side this gap is limited by the edge of the table, and on the other side it is limited by an edgewise belt.

All items drop into this gap which, due to their lengths and widths, are incapable of passing over it. Such items which only pass over the width of the gap in the diagonal position, are aligned with respect to their position by the belt, so that thereupon they drop into the gap.

According to a further object of the invention the conveying of the goods to be sorted or culled, into the gap, or to the edgewise belt and limiting the gap, is facilitated by the special embodiment of the edge of the table. This edge may be designed either as a roller, which is driven additionally, or may be movable in the longitudinal direction. It may also be driven by a vibrating system, in such a way as to perform a throwing effect oppositely to the direction of movement of the edgewise belt. Below the gap a trough is provided, the one longitudinal edge of which meets the lower edge of the table, and the other longitudinal edge of this trough is formed by a second edgewise belt. This conveyor belt then carries away the smallest-size items to be conveyed. The gap-limiting conveyor belt serves to carry away the items of a larger width, and a further conveyor belt, extending almost in parallel with the edge of the table, and guided at a suitable spaced relation therefrom, serves to carry away the thicker items to be conveyed, so that in postal operation letters with a normal size, large-size letters and small parcels can be separated with the aid of the device.

In order to enlarge the capacity of such a letter-sorting system two inclined tables can be used which are joined to one another and shaped like a gable-end roof, each table being equipped with the same types of directing devices.

The invention will be fully understood from the following description of an exemplified embodiment shown in the accompanying drawings, in which:

FIG. 1 shows a perspective view of a sorting or culling system according to the invention, FIG. 2 shows an end elevational view of a system resembling the embodiment according to FIG. 1, and FIG. 3 shows one individual element of the device according to FIG. 2.

In FIG. 1 the reference numeral 1 indicates the inclined planar table, which is crossed approximately centrally by a conveyor belt 2. The upper portion of the table 1 serves to receive the goods to be sorted or culled. The surface of the table has a small friction value, so that the goods to be conveyed slide on the table in accordance with the inclination and due to their own weight. The goods first of all reach the edgewise conveyor belt 2, which is adjustably mounted a predetermined distance above the table 1 to selectively eject goods. All items to be conveyed which have a greater thickness than the distance between table 1 and the belt 2 contact the conveyor belt 2 and are carried away by this belt in the direction indicated by the upper arrow $a$, which denotes the conveying direction. All other items to be conveyed travel underneath the conveyor belt 2 in the direction as indicated by the arrow $b$ towards the shaker strip 3. This shaker strip is movable in the longitudinal direction with respect to the table 1. For example, it may be supported in flat springs 8, and can be driven by a vibrator 7, which is in turn actuated by drive 24 providing the shaker strip with such a motion that the items to be conveyed are urged at right angles to the conveying direction. The conveyor belt 2 is provided with projections 9 which serve to carry the items along, and to change the direction of the items meeting against the belt. The belt 2 is arranged at an acute angle in relation to the inclined table 1, so that any items meeting vertically thereon fall flat against table 1 due to gravity. The projections 9 of the belt 2 extend over the lower edge of the belt, so that any letter jamming are eliminated by the movement of this belt. Finally, belt 2 conveys all letters which are stopped by it to a special conveying system or to a special type of container or bin. This operation of the belt is assisted by striking rollers 10 arranged in openings 12 in table 1 on both sides of this belt. The axes of rotation of the striking rollers which are above conveyor 2 are parallel to the direction of travel indicated by arrow $a$; the axes of rotation of the striking rollers which are below conveyor 2 are at right angles to the direction of travel indicated by arrow $a$. The mail items which are not carried away by the belt 2 are conveyed via the shaker strip 3 to the slot 22 according to the invention, which is limited on the one side by the shaker strip 3 and on the other side by a substantially horizontal belt conveyor 32. Below the gap or space a trough 5 is arranged supported by brackets 23, which is inclined in such a way that it finally leads to a second substantially horizontal belt conveyor 33. The distance between the belt 2 and the table 1, and the distance between the edgewise belt conveyor 4, and the edge 3 are adjustable, so that the sizes to be sorted can be changed according to requirements. It is obvious that items of a larger size are prevented from falling into the slot 22, and are carried over the gap towards the edgewise belt conveyor 4. By the vibrating movements of the shaker strip 3 congestions of the conveyed items in front of the gap or space are prevented, and the large-sized mail items, extending to the edgewise belt conveyor 4 are aligned with respect to their length.

Turning to FIGURE 2 the conveyors and their mountings are seen in end view. Frame 20 rests on base 21 which may be the floor. Supported on the frame 20 are brackets 16 and 16' which are mountings for motors 15 and 15' which drive conveyors 2 and 2'. The conveyors turn on rollers such as pulleys 26 and 27 shown in FIG. 1. Also mounted on frame 20 are brackets 19 and 19' which serve as mountings for motors 11 and 11' which drive conveyors 4 and 4'. The conveyors turn on rollers such as pulleys 28 and 29 shown in FIG. 1. Also mounted on frame 20 are brackets 18 and 18' which serve as mountings for motors 17 and 17' which drive conveyors 6 and 6'. The conveyors turn on rollers such as pulleys 30 and 31 shown in FIG. 1. A combination of two arrangements is shown in FIGURE 2. The combination is effected by joining two inclined planar tables at their upper edges. A support (not shown) similar to frame 20 is mounted at the end of table 1 opposite frame 20 and is used to support the opposite ends of conveyors 2, 4, 6, 32, 33, 2', 4', 6', 32' and 33'. Brackets 16 and 16' may be arranged in well known fashion with slots such that the motors 15 and 15' may be adjustably moved on the brackets thus effectively varying the spacing between conveyors 2 and 2' and planar table 1. Brackets 18, 18', 19 and 19' also have slotted holes so that the motors 11, 11', 17 and 17' may be moved backward and forward adjusting the size of slot 22.

Rollers 10 are shown arranged in two rows 14 and 14' above the conveyors 2 and 2' in the direction of flow of articles and in two rows 13 and 13' below conveyors 2 and 2'. The rollers in rows 14 and 14' are arranged so that their axes of rotation are parallel to the longitudinal direction of the planar table 1 and generally in the direction of arrow A. The eccentric arms of the rollers 10 is rotated by drives 25 in the direction of the curved arrow such that the striking force of the eccentric arms oppose the general direction of flow of the articles being sorted and serve to urge apart articles which are piled one on top of the other. The rollers 10 which are arranged in row 13 and 13' have their axes at right angles to the axes of rollers in row 14 and 14' and rotate in a direction such that their motion during the portion of their rotational cycle when they are above the table in passing through openings 12 is in the direction of arrow C, generally opposing the flow of articles and serving to separate articles which are piled one on top of the other.

Referring now to FIGS. 2 and 3, the arrangement and operation of the striking roller 10 is illustrated. In FIG. 3 the striking roller 10 is shown as an eccentric roller mounted on a shaft turning in a frame and actuated by drive 25. The eccentricity of the roller is such that it has an arm extending farther on one side of the axis of rotation than it does on the other. The rollers are mounted underneath and adjacent to the surface of the table 1 such that the eccentric portions of the rollers pass through openings 12 in the table 1 during rotation and strike any articles which are lying on the table at that point, thus lifting up these items and shaking them in a vibratory fashion, urging them apart such as to eliminate packing and jamming.

Conveyor belts 2, 4 and 6 are disposed essentially edgewise so that the surface of the belt engaging the mail articles urges the articles in the direction of the material flow which is indicated by arrow A.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An arrangement for preventing jamming during the sorting of mail items in a system having a plurality of conveying systems adapted to transfer mail items into several tracks according to their size comprising eccentric rollers mounted under an inclined table said table having openings through which the eccentric portions of the rollers protrude above said table, said rollers intermittently striking the items being sorted such that items which are piled one on top of the other are urged apart by the striking action of said rollers and are thus placed in position for further sorting.

2. An arrangement for preventing jamming during the sorting of mail items in a system having a plurality of conveying systems adapted to transfer mail items into several tracks according to their size comprising an inclined table having openings therein, a plurality of striking rollers mounted below the surface of said table in cooperation with said openings in said table, each of said striking rollers being eccentrically supported on a shaft and means to rotate said shaft, whereby the eccentric portions of said rollers pass through said openings in said table as said shafts are rotated striking mail items above said openings and urging apart mail items which are piled one on top of the other thus placing the mail items in position for further sorting.

3. A device as in claim 2 wherein said striking rollers are so oriented as to apply the striking forces in a direction generally opposite to the general direction of transfer of mail items being sorted.

4. An arrangement for preventing jamming during the sorting of mail articles in a system having a plurality of conveying means adapted to transfer mail articles into several tracks according to their size comprising a shaker strip mounted in the path of transfer of said articles, vibrator means to move said shaker strip, said shaker strip being reciprocatingly moved transverse to the direction of transfer of said articles such that the articles above the shaker strip which are piled one on top of the other are urged apart by the motion of said shaker strip and are thus placed in position for further sorting.

5. An arrangement for preventing jamming during the sorting of mail articles in a system having a plurality of conveying systems adapted to transfer mail articles into several tracks according to their size comprising an inclined table, a shaker strip mounted adjacent to the lower edge of said table and parallel thereto, vibrator means to impart a reciprocating motion to said shaker strip transverse to the direction of transfer of said articles such that articles above the shaker strip which are piled one on top of the other are urged apart by the motion of said shaker strip.

6. An arrangement for preventing jamming during the sorting of mail articles in a system having a plurality of conveying systems adapted to transfer mail articles into several tracks according to their size comprising an inclined table, a belt conveyor mounted above said table in a vertical plane forming an acute angle with the surface of said table, projections mounted on the belt of said belt conveyor and extending downwardly towards said table to a predetermined distance above said table whereby any pile-up of articles on said table which exceeds in height the clearance between said table and said projections is engaged by said projections and urged apart thus placing the articles in position for further sorting.

7. A device for separating articles according to size comprising; an inclined table having a plurality of openings therein; a first belt conveyor having projections thereon adjustably mounted in a vertical plane above the surface of said table, said first belt conveyor forming an acute angle with the surface of said table and spaced apart from said surface; flat articles which contact said first belt fall flat onto said table due to gravity whereby articles which are too thick to pass under said first belt conveyor are moved by said first belt conveyor along said table and articles which are thinner than said space pass between said first belt and said table and continue down said inclined table, said projections on said first belt conveyor projecting below the lower edge of said first belt conveyor and any pile-up of flat articles one on top of the other which exceeds in height the clearance between said projections and said table are urged apart by the movement of said first belt and said projections; a shaker strip mounted adjacent to the lower edge of said inclined table and extending over the entire length of the lower edge of said inclined table; means to reciprocatingly move said shaker strip backward and forward in a direction which is parallel to the longitudinal axis of said inclined table whereby articles above said shaker strip which are piled one on top of the other are urged apart by the motion of said shaker strip and placed in position for further sorting; a second horizontal belt conveyor mounted in spaced relation to said shaker strip and parallel thereto and to the longitudinal axis of said table and forming a slot between said shaker strip and said second horizontal belt conveyor, said spaced relation between said strip and said second horizontal belt conveyor being such that items which are large enough to extend across said slot are aligned in the direction of the longitudinal axis of the table and are conveyed away by said second horizontal belt conveyor; a third horizontal belt conveyor mounted below said second horizontal belt conveyor whereby articles having a horizontal dimension smaller than said slot fall through said slot and are conveyed away by said third horizontal belt conveyor; a plurality of striking rollers arranged in a first row and mounted below the surface of said inclined table in cooperation with a first row of said openings in said table on one side of said first belt conveyor in a vertical plane in a direction which is perpendicular to the longitudinal axis of said table; a plurality of rollers arranged in a second row and mounted below the surface of said table in cooperation with a second row of holes in said table and mounted on the other side of said first belt conveyor in a vertical plane in a direction which is parallel to the longitudinal axis of said table, each of said striking rollers being eccentrically mounted on a shaft and means to rotate said shaft, whereby the eccentric portions of said rollers pass through said openings in said table as said shafts are rotated striking articles above said openings and urging apart articles which are piled one on top of the other thus placing the articles in position for further sorting, the direction of rotation of said first row of rollers being such that the striking force of the rollers opposes the transfer of articles down said inclined table, the direction of rotation of said second row of rollers being such that the striking force is applied to said articles in a direction which is opposite to the direction of transfer of said articles whereby articles above said openings which are piled one on top of the other are urged apart and thus placed in position for further sorting.

References Cited in the file of this patent

UNITED STATES PATENTS

| | | |
|---|---|---|
| 1,035,887 | Maull | Aug. 20, 1912 |
| 1,140,782 | Welton | May 25, 1915 |

FOREIGN PATENTS

| | | |
|---|---|---|
| 1,058,934 | Germany | June 4, 1959 |